United States Patent [19]

Leleu

[11] Patent Number: 5,076,853

[45] **Date of Patent: * Dec. 31, 1991**

[54] METHOD AND APPARATUS FOR THE PREPARATION OF ANHYDROUS CRYSTALLINE DEXTROSE

[75] Inventor: Jean-Bernard Leleu, Lestrem, France

[73] Assignee: Roquette Freres, Lestrem, France

[ * ] Notice: The portion of the term of this patent subsequent to Jun. 5, 2007 has been disclaimed.

[21] Appl. No.: 531,409

[22] Filed: Jun. 4, 1990

Related U.S. Application Data

[63] Continuation-in-part of Ser. No. 262,048, Oct. 24, 1988, Pat. No. 4,931,101.

[30] Foreign Application Priority Data

May 15, 1985 [FR] France ................................ 85 07429

[51] Int. Cl.[5] ......................... C13F 1/02; C13K 1/00; B01D 9/00

[52] U.S. Cl. ........................................ 127/58; 127/60; 127/61; 127/62; 127/63; 23/295 R; 23/301

[58] Field of Search ...................... 127/58, 61, 63, 60, 127/62; 23/295 R, 301

[56] References Cited

U.S. PATENT DOCUMENTS 4,931,101 6/1990 Leleu .................................... 127/58

*Primary Examiner*—Aaron Weisstuch

*Assistant Examiner*—P. L. Hailey

*Attorney, Agent, or Firm*—Larson and Taylor

[57] ABSTRACT

A mass constituted by glucose syrup and anhydrous dextrose crystals is led to pass through from top to bottom and with malaxation of crystallization zone 1 of axis preferably substantially vertical in which said mass is subject to a temperature gradient globally decreasing by 0.2° to 2° C./hour from top to bottom possibly modulated, said zone being supplied through pipe 2 with glucose syrup and through pipe 7 with mass subject to crystallization M taken up at 8 and recycled at 9.

8 Claims, 1 Drawing Sheet

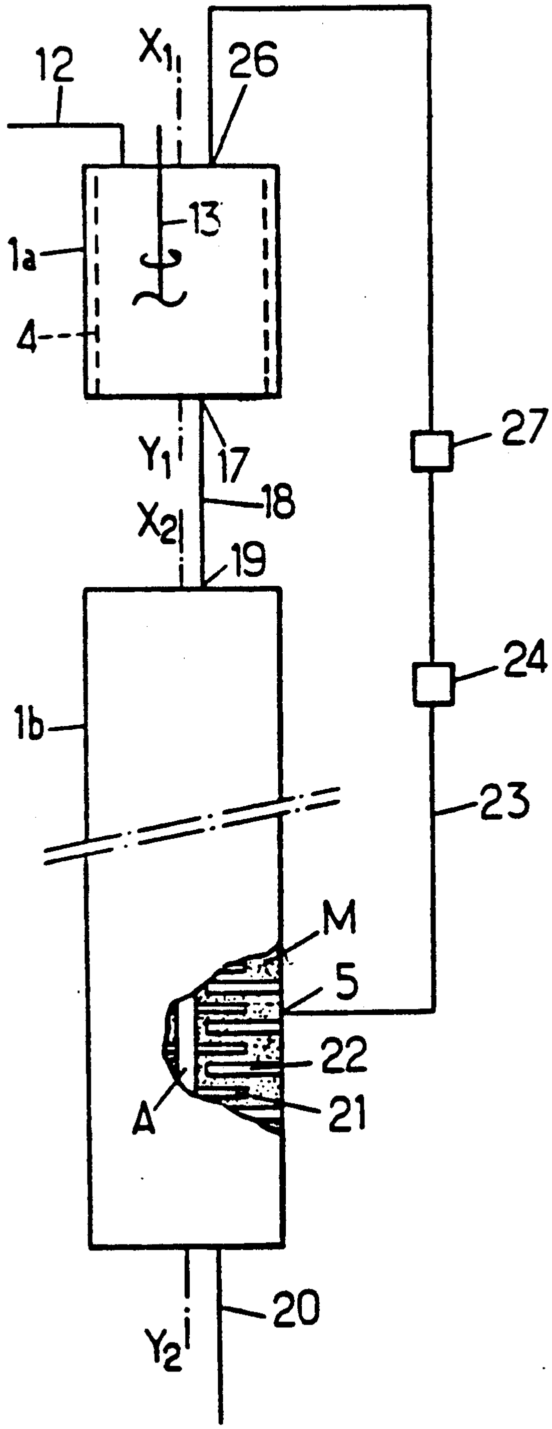
12
X1
26
13
1a
4
27
Y1
17
18
X2
19
24
1b
23
M
5
22
A
21
20
Y2

METHOD AND APPARATUS FOR THE PREPARATION OF ANHYDROUS CRYSTALLINE DEXTROSE

This application is a continuation-in-part of U.S. application Ser. No. 07/262,048 filed Oct. 24, 1988, now U.S. Pat. No. 4,931,101.

The invention relates to a method and to an installation for the preparation of anhydrous crystalline dextrose.

It is known to prepare anhydrous crystalline dextrose discontinuously by evaporation-crystallization of a starch hydrolysate. The principles of this method are disclosed in French Patent No. 2,046,352.

Recently, there was proposed in French Patent No. 2,483,427 a method enabling the preparation, continuously, from a starch hydrolysate, of an anhydrous product with a high content of dextrose.

The hydrolysate having a dry matter higher than 92% is stirred, in a first stage, preferably in the presence of crystallization seeds; the crushed dextrose so obtained is ground, conditioned on a fluidized bed and cooled.

These methods do not give entire satisfaction, the first by reason of too high an energy cost, the second by reason of a sophisticated apparatus and very delicate operation.

Now, in order to face up to the difficulties, particularly in the economic field, which are more and more severe, Applicants have sought to develop a process and an installation responding better than those preexisting to the various desiderata of practice, in particular precisely from the point of view of cost price of the anhydrous dextrose obtained and from the point of view of the simplicity of the equipment used and of the operation of the latter.

And they have found that this object could be achieved by means of a continuous process of preparing crystalline anhydrous dextrose comprising the steps of introducing a syrup rich in glucose having a richness in glucose higher than 92% by weight, an amount of dry matter higher than 80% by weight and a temperature above 60° C. into a starting zone of substantially vertical axis and having an upper and a lower end for initiation of the crystallization of dextrose, the temperature within said starting zone, which has a volume $V_a$, being substantially constant and less by 2° to 5° C. than the saturation temperature, causing said syrup to travel through said starting zone under stirring in the presence of anhydrous dextrose crystals acting as crystallization seeds, said syrup and said crystals forming a mixture, introducing said mixture when emerging from the initiation or starting zone into a crystallization zone separate from the starting zone and of axis substantially vertical arranged substantially in extension of the axis of the starting zone, the said crystallization zone having an upper and a lower end, a volume $V_b$ and a total length h, causing said mixture to travel under malaxation through said crystallization zone and subjecting said mixture within said crystallization zone to a temperature gradient decreasing globally from 0.2° to 2° C./hour from the upper to the lower end, selecting the volumes $V_a$ and $V_b$ in such a way that they satisfy one of the following inequalities $$0{,}4\ V_b > V_a > 0{,}05\ V_b \quad \text{(I)}$$

and $$0{,}5\ V_b > V_a > 0{,}4\ V_b \quad \text{(II)}$$

taking up at a level of the crystallization zone a fraction of the mixture travelling through said crystallization zone, the said fraction which is representing from 10 to 120% by volume of the amount of glucose syrup introduced into the starting zone, being taken up at a level of the said crystallization zone located at a distance from the upper end equal to at least h/3 and at a distance from the lower end equal to at least h/6 provided that $V_a$ and $V_b$ satisfy the inequality I, at a distance from the upper end equal to at least h/6 and at a distance from the lower end equal to at least h/2 provided that $V_a$ and $V_b$ satisfy the inequality II, recycling said fraction to the vicinity of the upper end of said starting zone, collecting at the lower end of said crystallization zone a crystalline mass rich in anhydrous dextrose crystals, recovering said anhydrous dextrose crystals from said crystalline mass.

According to an advantageous embodiment of the above process, the fraction of the mixture travelling through the crystallization zone which is recycled to the vicinity of the upper end of the starting zone, is taken up at a level of the crystallization zone located at a distance from the upper end equal to at least h/3 and at most equal to a value $h_1$ given by the equation $$h_1 = (-1{,}48\ V_a/V_b + 0{,}91)h$$

provided that $V_a$ and $V_b$ satisfy the inequality I, at a distance from the upper end equal to at least h/6 and at most equal to the above-indicated value $h_1$ provided that $V_a$ and $V_b$ satisfy the inequality II.

To carry out the abovesaid method, recourse is had, according to the invention, to an installation comprising essentially a first and a second vessel of axes preferably substantially vertical arranged preferably one above the other, the axes of the two vessels being preferably substantially in extension of one another, the first vessel, or crystallization starting vessel, being equipped on the one hand with a feed system of glucose rich syrup in the vicinity of its upper end, on the other hand with a stirring system for the contents of the vessel and with a system for regulation of the temperature adapted to establish inside the vessel a temperature constant at all points and finally with an extraction system arranged in the vicinity of its lower end, this system being adapted to withdraw the mixture of syrup and of crystals formed inside the vessel and to conduct this mixture to a point situated in the vicinity of the upper end of the second vessel, or crystallization vessel proper, being equipped with a system of malaxation of the contents and with a system for regulation of the temperature adapted to establish in the mass subjected to crystallization which fills it, a temperature gradient globally decreasing from top to bottom, which gradient possibly corresponds only to a first part of the second vessel, the second part of which being then at constant temperature at all points, the said second vessel being furthermore equipped, in the vicinity of its lower end, with a continuous extraction system for a product highly enriched in anhydrous dextrose crystals which is led by suitable means to a system adapted to recover the anhydrous dextrose crystals from this product, said installation being in addition equipped with a system of recycling to a point situated preferably in the vicinity of the upper end of the first vessel of a part of the contents of the second vessel taken up at a level of this second vessel determined according to the above process, or again to an installation comprising substantially three vessels preferably arranged one above the other, the axes of the three vessels being preferably substantially in extension of one another, the first and the second vessels being arranged as above indicated, being understood that the temperature gradient concerns the whole second vessel, the third vessel comprising stirring and temperature regulation means adapted to establish within said third vessel a temperature constant at all points.

The invention concerns also other features which are preferably used at the same time and which will be more explicitly considered below.

And it will, in any case, be well understood by means of the additional description which follows and the accompanying drawing which relate to advantageous embodiments.

The figure of this drawing shows diagramatically an embodiment of an installation according to the invention.

Consequently, in order to prepare crystalline anhydrous dextrose according to the invention, procedure is as follows or in equivalent manner.

As raw material, there is used a syrup rich in glucose, preferably free from crystals and from nuclei and coming, for example, from a starch hydrolysate; this syrup has a dry matter content higher than 80%, preferably from 82 to 90% and more preferably from 85 to 88% by weight, the glucose constituting at least 92% and, preferably a proportion higher than 94% by weight of the dry matter.

This syrup is led to an initiation zone for the crystallization, of preferably substantially vertical axis, which it is brought to pass through from the upper to the lower end whilst being subjected to continuous stirring; inside this zone, the syrup is maintained at a substantially constant temperature, less by 2° to 5° C. than the saturation temperature, due to which there is produced initiation of the crystallization which is manifested by formation of a mixture of glucose syrup and of anhydrous dextrose crystals.

The average dwell time of a given fraction of mixture inside this first zone is from 8 to 24 hours and preferably from 10 to 16 hours.

The mixture emerging from the initiation zone is then brought to pass through still from top to bottom, under malaxation, a crystallization zone proper.

The syrup travels continuously through the crystallization zone proper, whose axis is preferably substantially vertical, from the upper to the lower end from a point situated in the vicinity of its upper end; within said zone it is subjected, in the presence of crystals of anhydrous dextrose playing the role of crystallization seeds, to a malaxation and to a temperature gradient globally decreasing from top to bottom.

The temperature of the syrup is brought or kept, at the moment of its introduction into the crystallization zone, to a value above 60° C., preferably selected in the range from 80° to 90° C. and, in practice, in the vicinity of 85° C.

In practice, the temperature of the syrup is brought or maintained, at the moment of its introduction into the crystallization zone proper, at a value substantially equal to that of the syrup emerging from the starting zone.

The temperature gradient established inside the crystallization zone in the mass subjected to crystallization corresponds to a reduction of 0.2° to 2° C., preferably from 0.5° to 0.75° C. per hour of treatment and is such that at the outlet of said zone, at a point situated in the vicinity of the lower end of the latter, the mass subjected to crystallization which comprises the syrup, the crystals initially present and those formed by the phenomenon of crystallization, is brought to a temperature above 55° C. and preferably within a range of 58° to 65° C.

In an advantageous embodiment, the decreasing temperature gradient concerns only a part of the crystallization zone, which part then is followed by a part of the zone in which the temperature is constant at all points.

Progressively as the mass subjected to the crystallization approaches the lower end of the crystallization zone, its richness in anhydrous dextrose crystals increases, said mass forming at the outlet of the zone a mass rich in crystals of anhydrous dextrose.

The obtaining, in the vicinity of the lower end of the crystallization zone of this mass rich in crystals which can be extracted continuously without disturbing the parameters of the crystallization process, which disturbance would have had repercussions at the level of the subsequent separation step of the liquid phase and the crystals and which could necessitate intermittant stoppages of the installation, is rendered possible, according to the invention, due to the taking up, from the crystallization zone, of a fraction of the mass subjected to crystallization, fraction which is recycled and reintroduced into the starting zone at a level in the vicinity of its upper end.

The level from which the fraction to be recycled is taken up is selected as indicated above.

The fraction taken up and recycled represents, by volume, from 10 to 120%, preferably from 40 to 110% and more preferably from 80 to 100% of the volume of glucose syrup supplying the starting zone.

The glucose syrup supply rate is selected so that the average dwell time, of a given fraction of the mass subjected to crystallization within the crystallization zone is from 12 to 120 hours, preferably from 30 to 50 hours; the value selected depends on the composition of the feed syrup and the thermal exchange capacities of the means comprised by the zone, by means of which is established, inside said zone within the mass subjected to crystallization, the decreasing temperature gradient.

The viscosity of the mass subject to crystallization which increases progressively as the proportion of anhydrous dextrose crystals increases, that is to say in the descending direction, requires that the crystallization zone is, preferably, equipped with means for driving or aspirating adapted to facilitate the transportation of the mass inside the zone.

In addition, the means of malaxation and homogenization comprised by the crystallization zone must be arranged so that dead zones are avoided and that heat exchange between the mass subject to crystallization and the cooling means are as efficient as possible.

Preferably, the axes of the starting zone and of the crystallization zone proper are arranged in extension of one another.

A temperature gradient, globally decreasing from top to bottom, of 0.2° to 2° C./hour, preferably of 0.5° to 1.5° C./hour, is imposed on the mixture, that is to say on the mass subject to crystallization; advantageously the decreasing temperature gradient concerns only a first part of the crystallization zone, the second part of the latter being then characterized by a temperature substantially constant at all points, the said second part of the crystallization zone playing then the role of a ripening zone; at the level of the upper end of the crystallization zone, the temperature is 75° to 88° C. and at the level of its lower end, this temperature is higher than 55° C., preferably comprised between 58° and 65° C.

The mixture emerging from the crystallization zone proper or from the ripening zone is in the form of a crystalline mass rich in crystals of anhydrous dextrose, from which the latter are recovered.

The whole of the mass filling the crystallization zone traverses this zone in the manner of a "piston", which term is used in the technique.

The crystals collected at the outlet of the crystallization zone proper or at the outlet of the ripening zone show a granulometric spectrum sufficiently limited and an average granulometry sufficiently high to permit great facility of operation in the subsequent steps of draining and of washing the crystals.

The granulometry does not vary in time, whence the consequences already indicated at the level of the separation of the crystals which comprises a centrifugal draining and as the case may require a washing due to which a major part of the liquid phase is recovered. The latter forms mother liquors whose concentration of glucose is less than that of the starting syrup rich in glucose —this concentration is generally higher than 90%—and in which almost the whole of the impurities contained in said starting syrup is again found.

The mother liquors collected may be partly recycled.

Now, in order to carry out the process according to the invention, recourse may in particular be had to the installation which will now be discussed.

This installation as shown in the drawing comprises essentially two vessels 1*a* and 1*b* advantageously arranged one (1*a* ) above the other (1*b*); these vessels are advantageously in the shape of cylinders of revolution with axes $X_1Y_1$ and $X_2Y_2$ preferably substantially vertical and preferably situated in the extension of one another.

The vessel 1*a* has a preferably vertical axis $X_1Y_1$ and is equipped with a feed system of syrup rich in glucose at the level of its upper end and shown diagramatically by pipe 12, with a stirring system 13 and with a system of regulation of temperature diagramatically shown at 4 and adapted to establish a constant temperature at all points inside the vessel.

The mixture constituted of glucose syrup and anhydrous dextrose crystals which is formed inside the vessel 1*a*, flows from the latter at a point 17 situated in the vicinity of the lower end of this vessel; at this point the vessel can comprise a pipe 18 through which the mixture is led to the vessel 1*b*; it is also possible to provide for the outlet orifice of the vessel 1*a* to be positioned facing the input orifice of the vessel 1*b*, the two vessels then being juxtaposed.

As a general rule, it is however the arrangement shown in the drawing which is adopted, the two vessels being arranged one beneath the other preferably in extension of one another, the pipe 18 playing simultaneously the part of extraction pipe for the vessel 1*a* and of feed pipe for the mixture of glucose syrup and anhydrous dextrose crystals for the vessel 1*b* at a point of the latter in the vicinity of its upper end.

The vessel 1*b* is in the form of a cylinder of revolution of axis $X_2Y_2$, preferably substantially vertical.

Said vessel is equipped with a system of supply of syrup rich in glucose at the level of the upper end consisting in the above said pipe 18, with a system of malaxation and of regulation of temperature which will be discussed and with a system for continuous extraction at the level of the lower end of the vessel and shown diagramatically by a pipe 20, this system being adapted to recover the mass rich in dextrose crystals obtained at the outlet of the crystallization zone; this system of extraction can include aspiration means (not shown) which cooperate to cause the mass subjected to crystallization to pass through the vessel.

The system of malaxation and regulation of temperature which is discussed above may advantageously comprise a set of malaxation arms 21 borne at regular intervals by a rotary shaft A whose axis is merged with the axis $X_2Y_2$ of the vessel, cooling sheets 22 arranged in alternation with malaxation arms 21 and borne by the wall of the vessel 1*b*, these cooling sheets being traversed by a cooling fluid.

Advantageously, the vessel 1*b* may be arranged such that the globally decreasing temperature gradient concerns only a first part of the said vessel, the second part of the latter being then such that the temperature is substantially the same at all points.

The vessel 1*b* comprises in addition means shown globally by a pipe 23 comprising a pump 24 and adapted to take up at a level 5 of the vessel which is variable and which is selected as indicated above, a fraction of the mass M subject to crystallization and passing through the vessel 1*b* from top to bottom and to recycle this fraction to the abovesaid level 26 situated preferably in the vicinity of the upper end of the vessel 1*a*.

The pipe 23 can comprise fragmentation means 27, for example a grinder, adapted to disaggregate the largest anhydrous dextrose crystals contained in the recycled fraction.

The thermal exchange capacity, the system of temperature regulation, the speed of rotation of the malaxation means and the speed with which, under the influence of the aspiration means not shown, the mass subject to crystallization passes through the vessel, that is to say the average dwell time of a given fraction of this mass inside the vessel, are selected so that there is established, in the whole of the mass subject to crystallization, the temperature gradient provided according to the invention.

It is pointed out that, in practice, the cooling fluid is water and that the average temperature difference of a given point of the vessel between this water and the mass subject to crystallization, is of the order of 2° to 10° C.

In a further embodiment, the installation comprises the composing parts of the installation according to the second embodiment except that the second part of the second vessel is materialized by a third vessel independent from the first and the second vessel, this third vessel being located beneath the second vessel preferably in extension of the latter, the said third vessel comprising means of regulation of temperature adapted to impose a temperature substantially constant at all points.

EXAMPLE 1 a) Recourse is had to an installation according to the invention comprising two cylindrical vessels 1*a* and 1*b* of respective useful volume of 0.6 and 3 $m^3$.

There is introduced into the vessel 1*a*, with a flow rate of 80 l per hour, a glucose syrup having a content of dry matter of 86% and comprising 97.5% by weight on dry matter of glucose, the 2.5% remaining being constituted particularly by di- and polysaccharides.

The temperature of the syrup at the inlet of the vessel 1*a* is about 86° C.

This vessel 1*a* is provided with a stirrer and kept at the constant temperature of 82° C.

The average travel time inside the vessel 1*a* of a given fraction of the mixture of syrup and of dextrose crystals is about 7.5 hours.

The mixture emerging from the vessel 1*a* is brought through the pipe 18 at a point 19 of the vessel 1*b* situated in the vicinity of the upper end of the latter.

Within the vessel 1*b*, this mixture is subjected to a temperature gradient globally decreasing; the upper temperature of this gradient is 81° C. and the lower temperature is 61° C.

This gradient, decreasing globally from top to bottom, corresponds therefore to about 0.5° C. per hour.

At the level of the point 5 spaced from the upper end of the vessel 1*b* by 3/5 of the total height, that is to say slightly higher than the optimum level provided by the equation $$h_1=(-1{,}48\ V_a/V_b+0{,}91)h$$

is taken up a fraction of the mass subject to crystallization which passes through it and this fraction is recycled to the upper end of the vessel 1*a* at 26, after having ground the largest crystals in the grinder 27.

The recycled fraction corresponds to 80% of the amount of syrup introduced through the pipe 12.

The mass rich in anhydrous dextrose crystals extracted at the level of the lower end of the vessel 1*b* through the pipe 20 is at a temperature close to 61° C. and permits the separation of an amount of crystals corresponding by weight to 33.5% of the mixture.

The separation of the anhydrous dextrose crystals is carried out by centrifugal draining, then the crystals are washed.

The content of glucose of the mother liquors thus recovered is 96.25% on dry matter, the complement to 100 being constituted by di- and polysaccharides.

The crystallization yield which is given by the formula:

$$r=\frac{A-H}{100-H}$$

in which

A, which represents the richness in glucose of the feed syrup, is equal to 97.5%, H, which represents the richness of the mother liquors in glucose, is equal to 96.25%, is established at 33.5%.

785 kg of anhydrous dextrose are produced daily which corresponds to a productivity of 262 kg daily and per $m^3$ of the crystallization zone of the installation.

In addition, no disturbance requiring the stoppage of the installation occurs and it operates continuously.

The crystals collected after draining and washing show excellent physical and chemical properties.

These crystals are of a purity higher than 99.5%, their flow index is good and their granulometric distribution is as follows:

| | |
|---|---|
| crystals of size comprised between 200 et 500 μm | 51.4% |
| crystals of size comprised between 100 et 200 μm | 38.5% |
| crystals of size less than 100 μm | 7.1%. |

b) The same equipment and the same operational conditions are used.

However, at a given moment, after having reached the equilibrium of the system, the recycled fraction is taken up at a level situated outside the range according to the invention, that is to say at a level located at a distance equal to 0.05 h (h being the total height of vessel 1*b* ) from the upper end of the vessel 1*b*.

There is then rapidly witnessed a development of the parameters of the crystallization which is manifested after some hours by a more difficult separation at the level of the centrifuges because the granulometric distribution becomes too wide with consequence of a lower productivity.

EXAMPLE 2

Recourse is had to an installation according to the invention comprising two cylindrical vessels 1*a* and 1*b* of respective useful volume of 1.35 and 3 $m^3$.

There is introduced into the vessel 1*a*, with a flow rate of 80 l per hour, a glucose syrup having a content of dry matter of 86% and comprising 97.5% by weight on dry matter of glucose, the 2.5% remaining being constituted particularly by di- and polysaccharides.

The temperature of the syrup at the inlet of the vessel 1*a* is about 86° C.

This vessel 1*a* is provided with a stirrer and kept at the constant temperature of 82° C.

The average travel time inside the vessel 1*a* of a given fraction of the mixture of syrup and of dextrose crystals is about 17 hours.

The mixture emerging from the vessel 1*a* is brought through the pipe 18 at a point 19 of the vessel 1*b* situated in the vicinity of the upper end of the latter.

Within the vessel 1*b*, this mixture is subjected to a temperature gradient globally decreasing; the upper temperature of this gradient is 81° C. and the lower temperature is 61° C.

This gradient, decreasing globally from top to bottom, corresponds therefore to about 0.5° C. per hour.

At the level of the point 25 spaced from the upper end of the vessel 1*b* by ¼ of the total height is taken up a fraction of the mass subject to crystallization which passes through it and this fraction is recycled to the upper end of the vessel 1*a* at 26, after having ground the largest crystals in the grinder 27.

The recycled fraction corresponds to 80% of the amount of syrup introduced through the pipe 12.

The mass rich in anhydrous dextrose crystals extracted at the level of the lower end of the vessel 1*b* through the pipe 20 is at a temperature close to 61° C. and permits the separation of an amount of crystals corresponding by weight to 33.5% of the mixture.

The separation of the anhydrous dextrose crystals is carried out by centrifugal draining, then the crystals are washed.

The content of glucose of the mother liquors thus recovered is 96.25% on dry matter, the complement to 100 being constituted by di- and polysaccharides.

The crystallization yield which is given by the formula:

$$r = \frac{A - H}{100 - H}$$

in which

A, which represents the richness in glucose of the feed syrup, is equal to 97.5%, H, which represents the richness of the mother liquors in glucose, is equal to 96.25%, is established at 33.5%.

785 kg of anhydrous dextrose are produced daily which corresponds to a productivity of 262 kg daily and per $m^3$ of the crystallization zone of the installation.

In addition, no disturbance requiring the stoppage of the installation occurs and it operates continuously.

The crystals collected after draining and washing show excellent physical and chemical properties.

These crystals are of a purity higher than 99.5%, their flow index is good and their granulometric distribution is as follows:

| | |
|---|---|
| crystals of size comprised between 200 et 500 μm | 47.3% |
| crystals of size comprised between 100 et 200 μm | 42.6% |
| crystals of size less than 100 μm | 8.1%. |

I claim:

1. A method for the continuous preparation of anhydrous crystalline dextrose comprising the steps of
   - introducing a syrup rich in glucose having a richness in glucose higher than 92% by weight, an amount of dry matter higher than 80% by weight and a temperature above 60° C. into a starting zone of substantially vertical axis and having an upper and a lower end for initiation of the crystallization of dextrose, the temperature within said starting zone, which has a volume $V_a$, being substantially constant and less by 2° to 5° C. than the saturation temperature,
   - causing said syrup to travel through said starting zone under stirring in the presence of anhydrous dextrose crystals acting as crystallization seeds, said syrup and said crystals forming a mixture,
   - introducing said mixture when emerging from the initiation or starting zone into a crystallization zone separate from the starting zone and of axis substantially vertical arranged substantially in extension of the axis of the starting zone, the said crystallization zone having an upper and a lower end, a volume $V_b$ and a total length h,
   - causing said mixture to travel under malaxation through said crystallization zone and subjecting said mixture within said crystallization zone to a temperature gradient decreasing globally from 0.2° to 2° C./hour from the upper to the lower end,
   - selecting the volumes $V_a$ and $V_b$ in such a way that they satisfy one of the following inequalities $$0,4\ V_b > V_a > 0,05\ V_b \qquad (I)$$

and $$0,5\ V_b > V_a > 0,4\ V_b \qquad (II)$$

- taking up at a level of the crystallization zone a fraction of the mixture travelling through said crystallization zone, the said fraction which is representing from 10 to 120% by volume of the amount of glucose syrup introduced into the starting zone being taken up at a level of the said crystallization zone located
   - at a distance from the upper end equal to at least h/3 and at a distance from the lower end equal to at least h/6 provided that $V_a$ and $V_b$ satisfy the inequality I,
   - at a distance from the upper end equal to at least h/6 and at a distance from the lower end equal to at least h/2 provided that $V_a$ and $V_b$ satisfy the inequality II.
   - recycling said fraction to the vicinity of the upper end of said starting zone,
   - collecting at the lower end of said crystallization zone a crystalline mass rich in anhydrous dextrose crystals,
   - recovering said anhydrous dextrose crystals from said crystalline mass.

2. A method according to claim 1, wherein the fraction of the mixture travelling through the crystallization zone which is recycled to the vicinity of the upper end of the starting zone, is taken up at a level of the crystallization zone located
   - at a distance from the upper end equal to at least h/3 and at most equal to a value $h_1$ given by the equation $$h_1 = (-1{,}48\ V_a/V_b + 0{,}91)h$$

provided that $V_a$ and $V_b$ satisfy the inequality I,
   - at a distance from the upper end equal to at least h/6 and at most equal to the above-indicated value $h_1$ provided that $V_a$ and $V_b$ satisfy the inequality II.

3. A method according to claim 1, wherein said crystallization zone comprises a first part and a second part, and wherein said mixture is caused to travel under malaxation through the first and the second part of the said crystallization zone from its upper to its lower end and wherein said mixture is subjected within the first part to a temperature gradient decreasing globally from 0.2° to 2° C./hour and within the second part to a temperature substantially constant, the said second part acting as a ripening zone.

4. A method according to claim 1, wherein said fraction of the mixture travelling through said crystallization zone which is taken up from said crystallization zone, represents from 40 to 110% by volume from the amount of glucose syrup introduced into said starting zone.

5. A method according to claim 1, wherein the syrup introduced into the said starting zone has a richness in glucose higher than 94% by weight, an amount of dry matter of 82 to 90% by weight and a temperature of 80° to 90° C.

6. A method according to claim 1, wherein the syrup introduced into the said starting zone has a richness in glucose higher than 94% by weight, an amount of dry matter of 85 to 88% and a temperature of 80° to 90° C.

7. A method according to claim 1, wherein said syrup travelling under malaxation through said crystallization zone in the presence of anhydrous dextrose crystals acting as crystallization seeds, is subjected within said zone to a temperature gradient decreasing globally from 0.5° to 0.75° C./hour.

8. A method according to claim 1, wherein said fraction of the mixture travelling through said crystallization zone which is taken up from said crystallization zone, represents from 80 to 100% by volume of the said amount of glucose syrup introduced into the said crystallization zone.

* * * * *